(12) United States Patent
Fertner et al.

(10) Patent No.: US 8,705,636 B2
(45) Date of Patent: Apr. 22, 2014

(54) PASSIVE SINGLE-ENDED LINE TEST

(75) Inventors: Antoni Fertner, Stockholm (SE); Miguel Berg, Upplands Vasby (SE); Per Ola Borjesson, Lund (SE); Daniel Cederholm, Solna (SE); Klas Ericson, Alvsjo (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/375,532

(22) PCT Filed: Oct. 13, 2009

(86) PCT No.: PCT/SE2009/051165
§ 371 (c)(1),
(2), (4) Date: Dec. 1, 2011

(87) PCT Pub. No.: WO2010/140945
PCT Pub. Date: Dec. 9, 2010

(65) Prior Publication Data
US 2012/0069883 A1    Mar. 22, 2012

(51) Int. Cl.
*H04B 15/00* (2006.01)
*H04B 1/12* (2006.01)

(52) U.S. Cl.
USPC .......... 375/257; 375/222; 375/219; 333/17.3; 333/17.1; 333/12; 333/1; 326/30; 326/21

(58) Field of Classification Search
USPC .............. 324/520, 76.35; 375/227, 257, 222, 375/219; 333/17.3, 17.1, 12, 1; 326/30, 21
See application file for complete search history.

(56) References Cited

U.S. PATENT DOCUMENTS

| | | | |
|---|---|---|---|
| 4,435,974 A * | 3/1984 | Fuchs et al. ................. | 73/40.5 A |
| 7,212,008 B1 | 5/2007 | Barsumian et al. | |
| 7,679,371 B1 | 3/2010 | Lo | |
| 2006/0039322 A1* | 2/2006 | Furse et al. ................... | 370/328 |
| 2006/0080088 A1* | 4/2006 | Lee et al. ...................... | 704/207 |
| 2006/0182169 A1* | 8/2006 | Belge et al. ................... | 375/222 |
| 2009/0161741 A1* | 6/2009 | Ginis et al. ................... | 375/224 |

FOREIGN PATENT DOCUMENTS

WO    2004091105 A2    10/2004

* cited by examiner

*Primary Examiner* — Chieh M Fan
*Assistant Examiner* — Michelle M Koeth
(74) *Attorney, Agent, or Firm* — Rothwell, Figg, Ernst & Manbeck, P.C.

(57) ABSTRACT

The present invention relates to a method for estimating properties of a transmission line by means of features of a noise spectrum generated by noise entering said transmission line at an intermediate location between the ends of the line. The invention provides possibility to estimate a number of properties, e.g. length of a portion of the transmission line, line attenuation of said line portion and even line termination.

7 Claims, 21 Drawing Sheets

400

PASSIVE SINGLE-ENDED LINE TEST

CROSS-REFERENCE TO RELATED APPLICATIONS

This application is a 35 U.S.C. §371 National Phase Entry Application from PCT/SE2009/051165, filed Oct. 13, 2009, and designating the United States, which claims the benefit of U.S. Application Ser. No. 61/184,237, filed Jun. 4, 2009, the disclosure of which is incorporated by reference herein in its entirety.

TECHNICAL FIELD

The present invention relates to the field of transmission line analysis.

BACKGROUND

The present invention relates in general to the field of data communications and, more particularly, to a method to estimate one or more properties of a transmission line used for digital subscriber line (DSL) technology.

The digital subscriber line (DSL) is a widespread and popular technology that provides high-speed broadband communications to businesses, homes, schools and other consumers over existing telephone lines (conventional twisted-pair wire) without disturbing conventional voice telephony. One type of DSL is asymmetric DSL (ADSL), which normally uses a frequency division multiplexing (FDM) scheme that places the upstream (from customer) and downstream (to customer) communications in separate, non-overlapping, frequency bands. The capacity of a particular ADSL link depends on various transmission channel characteristics or properties of the line (conventional twisted pair wire) between the central office (CO) of the DSL service provider and the customer premises over the used frequency range. These properties are also important for initially setting up DSL service at a customer premises.

These line characteristics or properties can be determined using a training sequence that relies upon bidirectional communications between the DSL transceiver at the CO and the DSL transceiver at the customer premises. Such bidirectional communications are often unavailable because a DSL transceiver is not located at the customer premises prior to installation. As a result, measurement of the transmission characteristics or line properties between a CO and a possible customer premises are performed using a single-ended line test (SELT) by measuring the characteristics from the CO end of the connection.

One SELT method to estimate the length and attenuation of a transmission line involves a technique generally called time domain reflectometry (TDR). With the TDR technique a signal (e.g. a pulse) is transmitted on the line and the received echo signal is recorded. The received signal will contain one or several echoes that could come from: the far-end side of the line, bridged taps, any cable gauge changes etc. A TDR methodology for loop qualification and characterization is described in Galli et al., "Loop Makeup Identification via Single Ended Testing: Beyond Mere Loop Qualification", IEEE J. Selected Areas in Communications, Vol. 20, No. 5 (June 2002), pp. 923-935. One difficulty with the traditional TDR method is that the reflected pulse can be heavily attenuated and be difficult to detect, as it is hidden by the rather broad outgoing pulse. To avoid this problem, the pulses can be filtered, but the Galli article suggests to instead subtract the outgoing pulse to get a distinct reflected pulse. Another problem with the traditional TDR method is that for short lines, the outgoing and reflected pulses are close to each other and are difficult to separate. For a very long line, on the other hand, the reflected pulse is heavily attenuated and can be hidden in the noise. As a result, only one pulse is observable in some traditional TDR measurements and it is impossible to know if it is a result of the line being very short or very long.

From WO 2006/059175 A1 is a system and method earlier known, which utilizes a transceiver unit comprising a FIR-filter for solving the above stated problems.

Thus, the problem by using echo measurement, such as the described SELT technique, is that it has a number of drawbacks. The distance (time) resolution of the echo measurement is limited both by the hardware transmission bandwidth and regulatory constraints where transmission might be prohibited in certain frequency bands. An example of this is a typical transceiver at the customer premises, ADSL2+ATU-R (ADSL Transceiver Unit Remote Side), which can receive on 2.2 MHz bandwidth but transmit on only 138 or 276 kHz. In many cases, the transmit bandwidth is too small to get good distance resolution in e.g. TDR analysis. Another limiting factor is loop attenuation which may make it impossible to detect the reflected signal, especially for long lines. Yet another limiting factor is noise which can mask the reflected signals. Further, a conventional transceiver unit has to be adapted to perform echo measurement by adding software or circuitry for generation of the test signal, as described in prior art documents above, to be able to perform an echo measurement.

SUMMARY

The object of the present invention is to provide an improved method that solves the above described problem.

The present invention provides a method for estimating properties of a transmission line by means of features of a noise spectrum generated by noise entering said transmission line at an intermediate location between the ends of the line.

The present invention proposes a passive single ended line test for measuring and analyzing noise on the transmission line, utilizing the fact that even the background noise, bounces back and forth on the transmission line and creates an interference pattern. The measurement and calculation is based on a mathematical model of the noise interference pattern from which it is possible to estimate features of the transmission line, e.g. length of the line, location of and/or distance to a fault, line attenuation and line termination.

One aspect of the present invention is a method for estimating properties of a transmission line, said line having a first end and a second end opposite to the first end. Said noise enters said transmission line at an intermediate location between the first and the second end. The method comprises the steps of:
  measuring a spectrum of the noise at the first end of the line; and
  estimating one or more transmission properties in dependence of features of said spectrum.

The transmission property estimates are estimates of transmission properties of a transmission line or a segment of the line, said segment being the part of the line between the location where noise enters the line and the second end of the line.

Yet another aspect of the present invention is a transceiver electrically connectable to a transmission line, characterized in that the transceiver comprises means adapted to perform passive SELT according to the invented method.

The measurement is performed by a transceiver comprising means for performing the present invented method. Said transceiver may be integrated with a xDSL modem, IP DSLAM etc. The estimation of the transmission properties could be performed either by an internal processor in the transceiver or a separate computer, PC, processor, CPU, etc.

Further one aspect of the present invention is a method for estimating the transmission property length of the transmission line or the line segment, which is a part of the transmission line.

Another aspect of the present invention is a method for estimating the transmission property attenuation for the transmission line or a segment of the line.

An additional aspect of the present invention is a method for estimating the transmission property line termination.

A further aspect of the present invention is a method to detect and localize noise ingress on a transmission line.

The present invention provides a number of advantages over active SELT and other echo measurement techniques.

One advantage is that the invented method is based on measurements on the transmission line at one of the line ends without provoking the line with test signals. Thus no probing signal energy that may insert cross-talk in neighboring lines has to be sent out.

Further one advantage is that it is possible to perform the invented method by a less complex transceiver design than a transceiver adapted for active SELT measurement and other echo measurement methods. The passive SELT transceiver eliminates the use of a signal generator and FIR filter.

Another advantage is that the frequency spectrum of the received measured signal will only depend on receiver bandwidth limitations, not on transmitter bandwidth limitations and regulatory spectrum limitations on transmitted signals.

An additional advantage is that the line features extracted from the received transmission line signals can be achieved in a straightforward way without extended, time-consuming calculations.

DETAILED DESCRIPTION

While the making and using of various embodiments of the present invention are discussed in detail below, it should be appreciated that the present invention provides many applicable inventive concepts that can be embodied in a wide variety of specific contexts. The present invention will be described in connection with a digital subscriber line (DSL) modem transceiver, integrated in xDSL equipment, IP DSLAM, etc. However, this invention may also be used in other applications and implementations including, for example, modulation techniques used for other types of DSL or transceivers. Accordingly, the specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Figure 1:
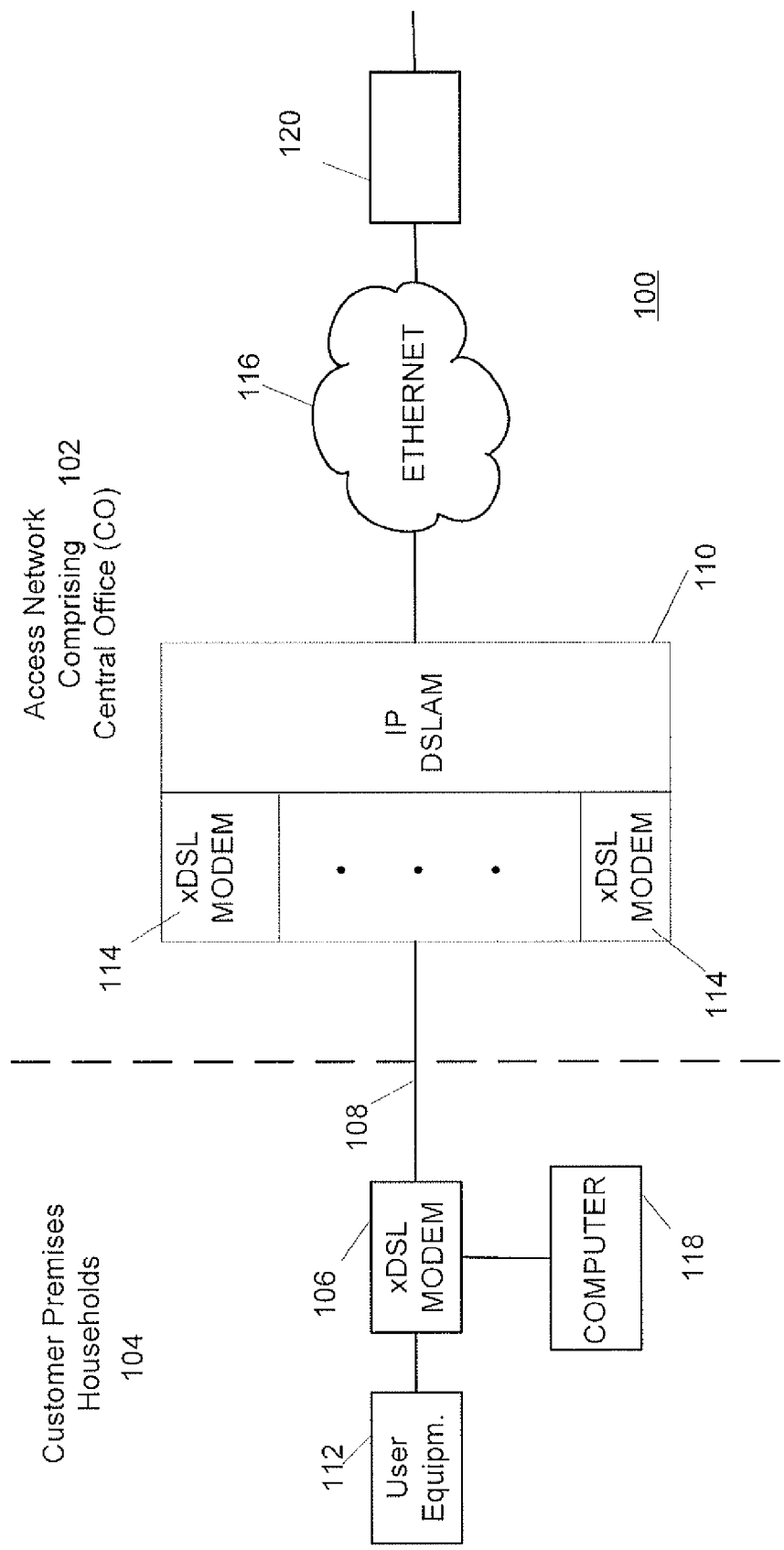
FIG. 1 is a block diagram depicting the architecture of a digital subscriber line (xDSL) system.

Now referring to FIG. 1, a block diagram depicting the architecture of a conventional digital subscriber line (xDSL) system 100 wherein the present invention may be used. The xDSL system 100 includes an access network comprising a central office (CO) 102 that connects the customer premises (households, offices, etc.) 104 to various service/content providers (not shown). Note that the actual xDSL communications may be implemented between the CO 102 and the customer premises 104 over a two-wire pair phone line 108 (also referred to as a local loop or a twisted pair line). As shown, the access Network 102 provides broadband services to the customer premises 104 using a service rack 110 that includes one or more Internet Protocol Digital Subscriber Line Access Multiplexers (IP DSLAM) 110. Each IP DSLAM 110 contains one or more xDSL modems 114. Note that a CO 102 may contain multiple xDSL service racks 110 and various other control, management, switching, routing and remote equipment. In some implementations, the IP DSLAM or parts thereof may be relocated from the Central Office to a remote location such as a street cabinet. For simplicity, the term CO in the text hereafter, will refer to the location of the xDSL transceiver of the IP DSLAM and not necessarily to the Central Office building.

The IP DSLAM 110 is connected to various devices 120 (e.g., router, BRAS and telephone exchange) to assemble, package and provide services and content from the service/content providers via a network, such as Ethernet 116, or other routing/switching means. For example, database access, broadcast media and video on demand are available via a router (device 120). In addition, the Internet is available via a Broadband Remote Access Server (BRAS) (device 120), and telephone services via Public Switched Telephone Network (PSTN)) are available via telephone exchange (device 120). The CO of the Access Network 102 assembles the broadband services via the IP DSLAM 110 for appropriate transformation and transmission by one or more xDSL modems 114. Each of the xDSL modems 114 may be in communication via a dedicated twisted-pair telephone line 108 with a suitably configured xDSL modem 106 at customer premises 104. The xDSL modem 106 at customer premises 104 is configured to process and distribute the multiple broadband services to appropriate destination devices, such as digital telephones, computers 118 and audiovisual equipment 112. The customer premises 104 may also have plain old telephone system (POTS) devices, such as analog telephone and facsimile machine integrated on the twisted-pair telephone line 108 along with the xDSL modem 106. Note that in some applications, customer premises 104 may be replaced with another CO or an xDSL repeater.

Figure 2:
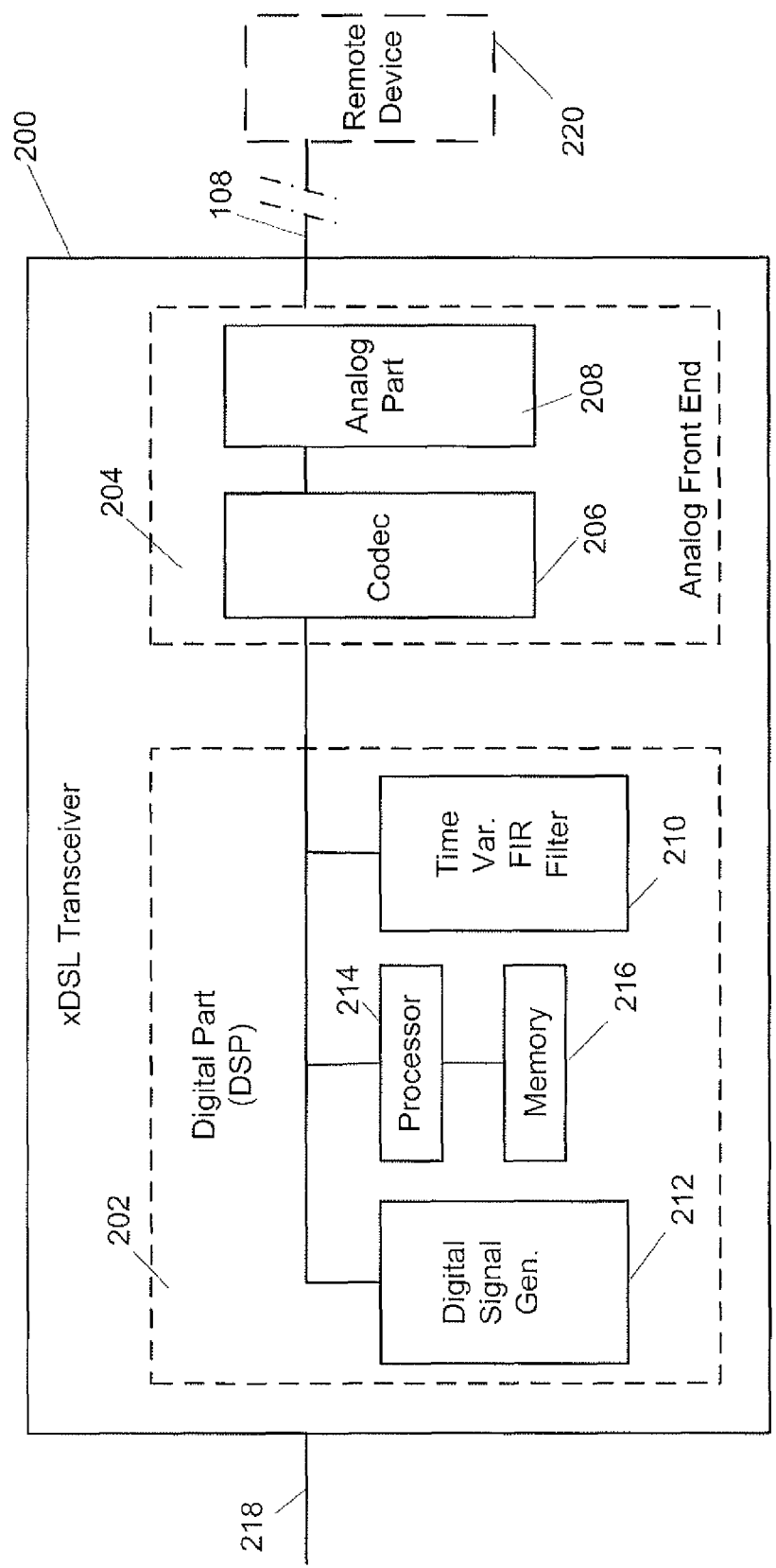
FIG. 2 is a block diagram of an xDSL transceiver unit in accordance with known prior art.

Referring now to FIG. 2, a block diagram of a xDSL transceiver unit 200, which is part of a xDSL modem (e.g., xDSL modem 114 of FIG. 1) in accordance with known prior art, e.g. as described in WO 2006/059175 A1. The xDSL transceiver unit 200 is configured to transmit signals to and receive signals from the remote device 220 or customer premises xDSL modem via a transmission line 108, e.g. twisted pair phone line. The xDSL transceiver unit 200 is only depicted with those blocks necessary to describe the present invention as used to perform passive SELT to characterize the transmission line 108. As a result, the xDSL transceiver unit 200 has many components and features that will not be described herein.

The xDSL transceiver unit 200 includes a digital part (digital signal processor (DSP)) 202 and an analog front end (AFE) 204, which includes a coder/decoder (Codec) 206 and an analog part 208. The digital part 202 includes a filter 210, a digital signal generator 212, and a processor or computational device 214 interconnected with memory 216. Although the filter 210 is shown as part of the digital part 202, in some configurations it can be included as part of the digital side of codec 206 instead. The transceiver unit 200 also has an input/output 218.

The analog part 208 typically includes analog filters, a hybrid circuit, and a line driver and receiver. The hybrid circuit, which is connected to the twisted-pair facility serving as transmission loop, is a conventional circuit that converts the two-wire arrangement of the twisted-pair facility to dedicated transmit and receive lines connected to the line driver and receiver. The analog part 208 is connected to codec 206, which carries out analog-to-digital, and digital-to-analog conversion.

This xDSL transceiver unit 200, which is part of an xDSL modem, performs a conventional single-ended loop test (SELT) by applying signals to the loop (line 108) and characterizes the transmission parameters of the loop based on the response of the loop to these applied signals. The loop may be terminated by a remote device 220. More specifically, the digital signal generator 212, which is connected to processor 214, sends a broadband test signal Vout to the line 108 via the codec 206, and analog part 208. A reflected broadband loop test signal Vin is received and processed by the digital part 202 via the line 108, analog part 208 and codec 206. The echo transfer function $H_{echo}(f)$ is estimated as Vin(f) divided by Vout(f), where f denotes frequency. The echo impulse response is calculated by the Inverse Discrete Fourier Transform (IDFT) of $\{H_{echo}(f)\}$, which gives $h_{echo}(n)$, where n denotes time sample number. Thus, IDFT $\{H_{echo}(f)\}=h_{echo}(n)$. In practice, the Inverse Fast Fourier Transform (IFFT) would be used instead of IDFT. The processor 214 analyzes the filtered reflected broadband loop test signal to determine or estimate one or more properties of line 108.

The present invention will not make use of any signal generator for applying a test signal to the transmission line, and the present invention is therefore denoted as passive SELT. The present invention therefore has the advantages to avoid disturbing other lines, and to allow measurement on frequencies not supported by, or not allowed for use by, the xDSL transmitter.

Figure 3:
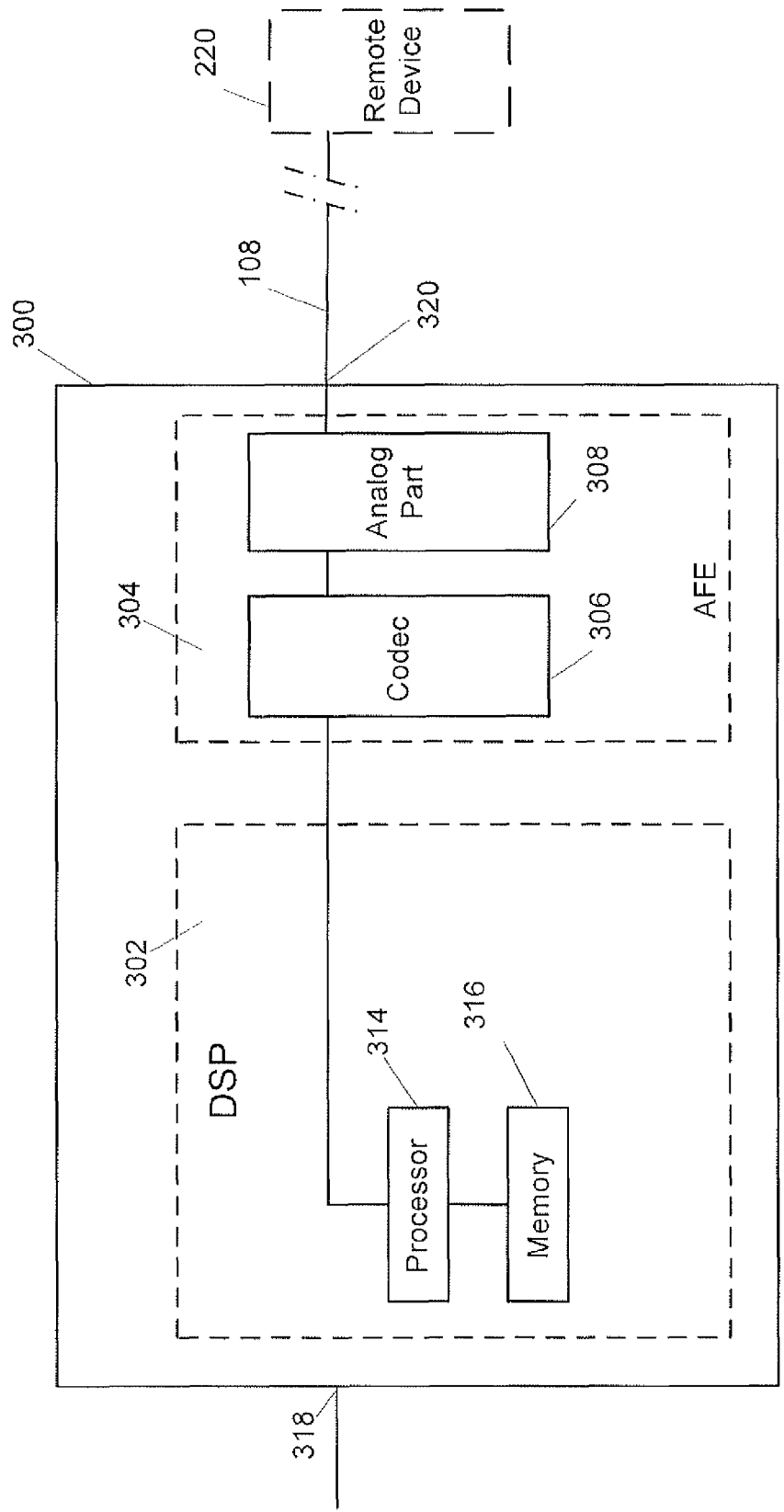
FIG. 3 is a block diagram of an xDSL transceiver unit operating according to the present invention.

FIG. 3 is a schematic illustration of an xDSL modem comprising a transceiver unit operating according to the present invention.

Referring now to FIG. 3, a block diagram of an xDSL transceiver unit 300, which may be a part of a xDSL modem. The xDSL transceiver unit 300 is configured to transmit signals to and receive signals from the remote device 220 or customer premises xDSL modem via a transmission line 108, e.g. twisted pair phone line. The xDSL transceiver unit 300 is only depicted with those blocks necessary to describe the present invention as used to perform passive SELT to characterize the transmission line 108. As a result, the xDSL transceiver unit 300 has many components and features that will not be described herein.

Compared to the known transceiver 200 described and illustrated above in FIG. 2, both said known transceiver (200 in FIG. 2) and the xDSL transceiver unit 300 operating according to the invention include a digital part (digital signal processor (DSP)) 302 (202 in FIG. 2) and an analog front end (AFE) 304 (204 in FIG. 2), which may include a coder/decoder (Codec) and an analog part. However, the digital part 302 of the transceiver does not need to include a digital signal generator (212 in FIG. 2). Further, transceiver unit 300 may also include a processor or computational device 314 interconnected with memory 316. The transceiver unit 300 also has inputs/outputs 318 and 320 for receiving and forwarding signals and data traffic from connected devices (see also FIG. 1) to be able to process and distribute multiple broadband services. In the illustrated example, the transmission line 108 is connected to input/output 320 and the input/output 318 is connected to appropriate destination devices, such as digital telephones, computers and audiovisual equipment at customer premises.

This xDSL transceiver unit 300, which is part of an xDSL modem, is adapted to perform a passive single-ended loop test (SELT) and characterize the transmission parameters of the loop based on the registration of a noise interference pattern generated by a noise entering said transmission line 108 at an intermediate location between the first and the second end of the transmission line. The DSP 302 is adapted to measure a spectrum of the noise at the first end of the line. From said measure, it is possible to estimate one or more transmission properties in dependence of features of said spectrum. Said transmission property estimates are estimates of transmission properties of a whole transmission line or a segment of the line, said segment being the part of the line between the location where noise enters the line and the second end of the line.

Figure 4:
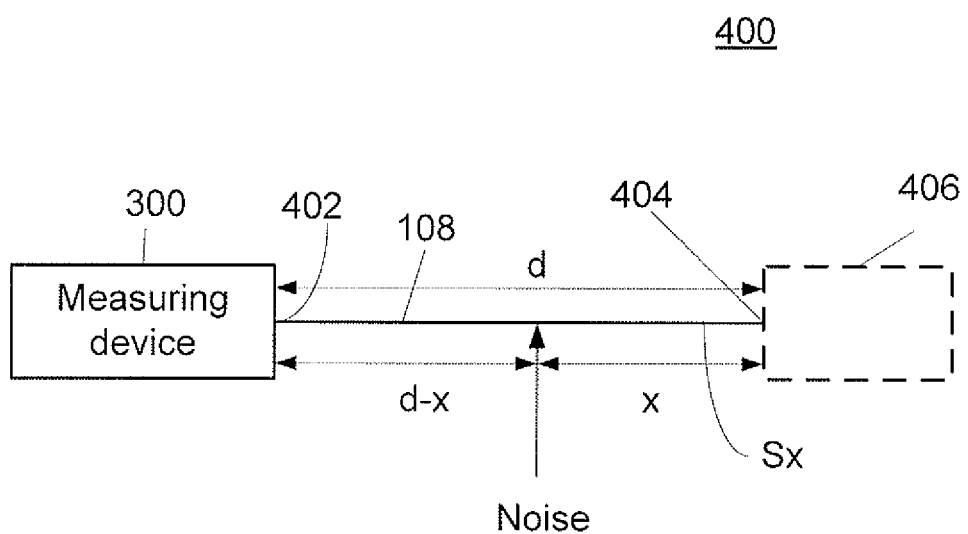
FIG. 4 is a block diagram of a measurement system according to the present invention.

FIG. 4 is illustrating schematically a measurement system 400 according to the present invention. The transmission line 108 has two ends, denoted a first end 402 and a second end 404 situated opposite to the first end 402. At one of the ends is a measuring device 300, preferably transceiver 300 according to the invention, situated and connected. The opposite end 404, may be terminated or open. A transceiver 406 may be connected to the opposite end, however, it is not necessary for the function of the invention of reasons that will be understood and/or obvious by the description. The end where the measuring transceiver, e.g. integrated in an xDSL modem, IP DSLAM etc, is situated is often denoted the near end and the opposite end is then denoted the far end. A noise source (not illustrated) is generating e.g. white (Gaussian) noise. As mentioned previously, noise influx can be caused by numerous mutually independent noise sources, such as thermal noise generated by adjoining electronics and/or crosstalk which is uniformly distributed at the length of the transmission line, RF ingress etc. As illustrated by an arrow, said noise enters said transmission line at an intermediate location between the first and the second end. The present invention utilizes the fact that the noise intercepted by the transmission line result in electromagnetic waves propagating in both directions and reflecting from line ends whether they are terminated or not. When waves are added together, their sum is determined by the relative phases as well as the amplitudes of the individual waves. The summed amplitude of the waves can have any value between zero and the sum of the individual amplitudes. In physics, this phenomenon is referred as interference to the superposition that results in a new wave pattern. Hence, interference patterns usually have a series of maxima and minima. Examples of measured interference patterns are disclosed in FIGS. 6a, 7a, 8a, 9a, 10a and 11a, and said examples will be discussed further down in the description.

Analysis of the interference pattern allows determining of transmission line properties, such as transfer function parameters. Transfer function parameters are such parameters upon which the transfer function depends and, hence, noise characteristics as such are excluded. Said transmission line properties estimated may be estimates of transmission properties of a segment of the line, said segment being the part of the line between the location where noise enters the line and the far end of the line. Said segment is denoted Sx and has the length x. The length of the transmission line between the two opposite ends is d. The remaining part of the line between the near end and the location where the noise enters will then be of length d−x.

Figure 5:
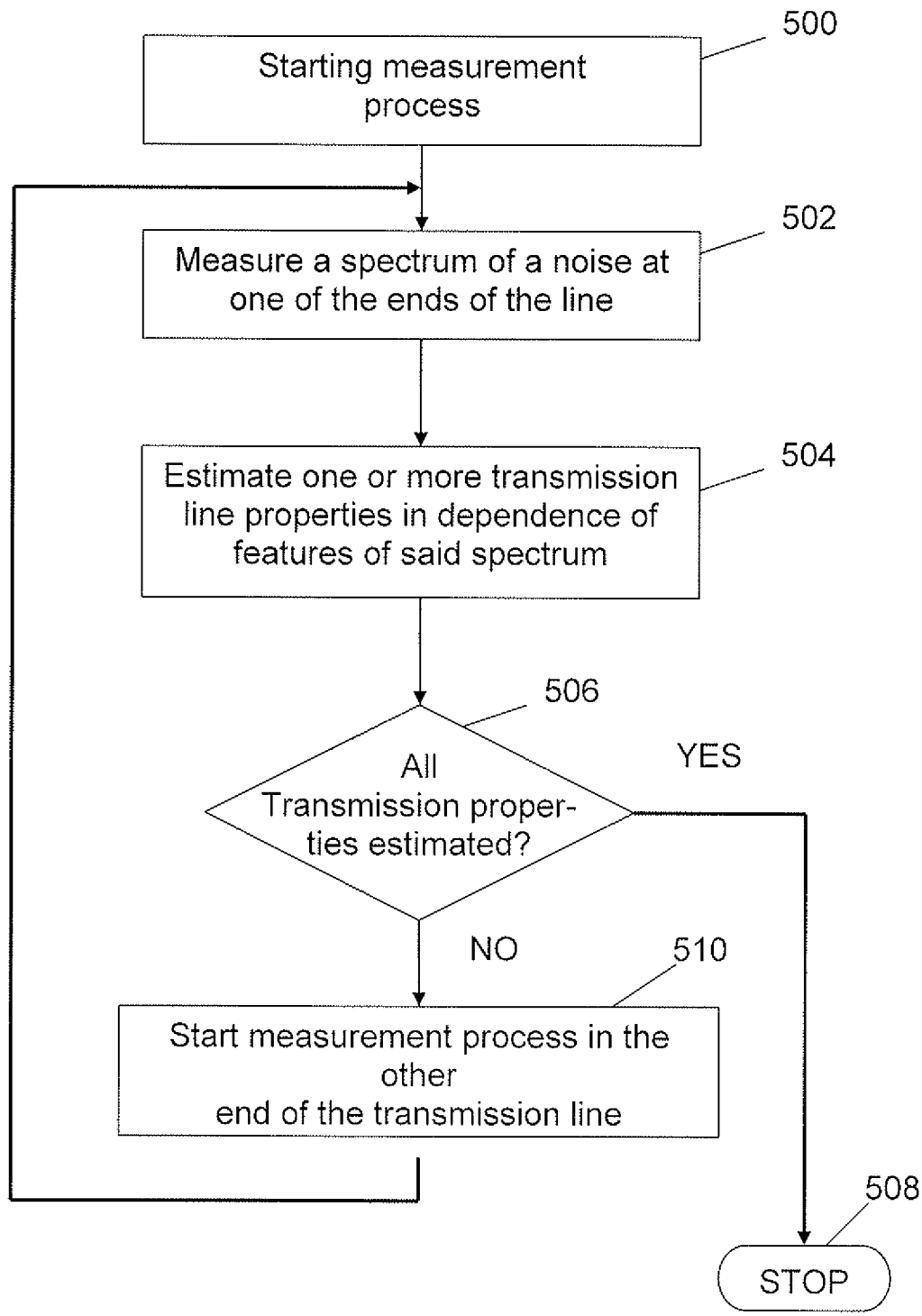
FIG. 5 is a flowchart illustrating an embodiment of the method according to the present invention.

FIG. 5 is a flowchart illustrating steps of an embodiment of the invented method.

Now referring to FIG. 5, the invented method will be described with a simple but illustrative example of a single un-terminated (open end) transmission line (108 in FIG. 4) of unknown length as depicted in FIG. 4. The pulses are reflected and dispersed and attenuated due to passing through the cable. The total voltage on the transmission line is given by the principle of superposition, i.e. adding waves traveling back and forth through the cable. It should be noted that throughout this text it is assumed for simplicity that the loop under investigation consists of a homogenous cable. The interference pattern depends mainly on the position of the injection point. If the cable had involved several segments with different impedances, the interference pattern would have been much more complicated due to internal reflexes but the methods of the invention may still be applied for some loops consisting of segments of different characteristic impedance.

The methods presented herein are valid when noise enters at an intermediate location along the line. However, they are also valid when applied to the case where x=d, i.e. when noise enters the line at the end where measurement takes place. Results then apply to the whole line rather than to a segment of the line. This may, for example, be the case when a piece of equipment attached to the line end unintentionally injects noise to the line. The noise may even originate from the measurement equipment itself.

The first step 500 is to start up a measurement process by activating the connected passive SELT measurement device 300 (see FIG. 3 or FIG. 4), i.e. a transceiver 300 operating according to the invention. The transceiver 300 connected to one of the transmission line ends 402, will then start to measure and register measurement data values, step 502, of the noise levels in different frequency intervals of the spectrum by means of the DSP block (302 in FIG. 3). The measured level values of noise constituting the measured noise characteristic data, also denoted data values or measured data values hereafter, are recorded and stored either by means of the internal storage (316 in FIG. 3) or a connected external storage (not shown). Said data values may preferably be stored in a vector format, e.g. at least one power level for each frequency interval. The noise levels may show a great variation from one moment to another and it is favorable to filter the measured data values over time which means to register a number of measured data values for each interval over a time period and keep an average value of the noise level in a frequency interval. Nevertheless, the registered data values of noise will result in stored measurement data values that either may be the registered data values or data values that are processed, e.g. filtering and/or calculation, from said registered data values.

The stored measured data values may then be used for producing diagrams for illustrating the variation of noise magnitude versus frequency as in FIGS. 6, 7, 8, 9, 10 and 11. Said figures will be described in more detail further down.

The next step of the method, step 504, is to estimate one or more transmission properties in dependence of features of said spectrum. The transmission property estimates are estimates of transmission properties of the whole line or a segment Sx of the line, said segment Sx being the part of the line 108 between the location where noise enters the line and the far end of the line. A number of properties could be estimated, but in this description the focus will be set on the properties length of the line or line portion (segment), line attenuation, and line termination. It should be noted that noise ingress can be caused either by a physical fault on the line (e.g. leakage to ground) or by a strong noise source (high power and/or located close to the transmission line). A strong noise source can be considered as a fault even if the line itself is not faulty. Now, if noise is introduced at the point of a fault, or the line is broken, the location of, and the distance to, the fault may be estimated. The estimation may be performed by the internal processor (computer 314 in FIG. 3) of the transceiver 300 or by an external processor or computer to which the measured data values are transferred.

To estimate the length of a segment or a whole line, an autocorrelation function of the measured power spectrum of the noise can be used. In more detail, the transmission property length of a segment (portion) Sx is estimated by first estimating the period of the interference pattern and assuming a velocity-of-propagation (VOP) for the cable segment. In particular, this could be performed by:

determining an autocorrelation function from the measured power spectrum of the noise;

converting the time axis in the autocorrelation function to distance by using the assumed VOP;

identifying the distance for which the greatest extreme value (ignoring the trivial extremes corresponding to zero distance), maximum or minimum, of the autocorrelation is detected; and setting said distance (x) as an estimate for the length (x) of the segment (Sx).

Apart from showing the length x of segment Sx, the autocorrelation function may show additional extreme values e.g. if there are impedance discontinuities on the line. Further extremes may also show the total loop length d and integer multiples thereof.

To estimate line attenuation, the first step is to determine an upper envelope by using the detected maxima values from the measured power spectrum of the noise and to determine a lower envelope by using the detected minima values from the measured power spectrum of the noise. Finally, in logarithmic (e.g. dB) scale, the lower envelope is subtracted from the upper envelope and the difference in magnitude per frequency constitutes an estimate of a known function of the line attenuation. In more detail, the transmission property line attenuation is determined by the steps of:

determining an upper envelope by using the detected maximum values from the measured power spectrum of the noise and a lower envelope by using the detected minimum values from the measured power spectrum of the noise;

subtracting the corresponding lower envelope values from the upper envelope values (in logarithmic scale); and setting the difference in magnitude per frequency as an estimate of a known function of the line attenuation inverting said function numerically or analytically.

To determine line termination an autocorrelation function of the measured power spectrum of the noise can be used, and if the greatest extreme value is a peak, i.e. a maximum, the sign of the far end reflection coefficient is positive meaning that the line is terminated with an impedance higher than the line's characteristic impedance (high impedance termination, e.g. an open circuit). On the other hand, if the greatest extreme value exhibits a dip, i.e. a minimum, the sign of the far end reflection coefficient is negative, meaning that the line is terminated with an impedance lower than the line's characteristic impedance (low impedance termination, e.g. a short circuit). In more detail, the transmission property line termination is determined by the steps of:

determining autocorrelation function values of the measured power spectrum of the noise; and determining if the greatest extreme value (ignoring the extreme corresponding to zero distance) is a peak, i.e. maximum value, or a dip, i.e. minimum value, of said autocorrelation; and setting the termination as high impedance, if the greatest extreme value is a peak or setting the termination as low impedance if the greatest extreme value exhibits a dip, i.e. a minimum. If the magnitude of the reflection coefficient is also known, e.g. through a priori information or by estimation of the magnitude, e.g. by using eq. (9), together with the attenuation using eq. (2), the ratio between the termination impedance and the line's characteristic impedance can be determined.

In step 506, it is checked whether the measurement process is complete, or not. If "yes", the measurement process will stop, step 508. However, an operator of the measurement system may wish to determine transmission properties of the rest of the transmission line 108 and just not a segment Sx of said line. To be able to do so, a measurement device, such as a transceiver 300 adapted for passive SELT measurement according to the invention, has to be connected to the opposite end 404 in relation to the first end 402 where a passive SELT measurement process just have been performed. If the condition check in step 504 is responded with a "No", the passive SELT measurement process will start in the measuring transceiver (406 in FIG. 4), step 510. The measurement step 502 and estimation step 504 will then be repeated and performed in the measurement device 300 at the second end 404, which this time becomes the near end.

When the measurement step 502 and the estimation step 504 are completed, the described process may be brought to stop, step 508, via the checking step 506.

By performing the invented measurement process from both ends, it is possible to determine transmission line properties for the whole transmission line by combining the result from the two measurement executions.

How the transmission line properties are estimated from the measurement results will now be explained in the following part of the description. Further, illustrating application examples will be presented.

Presentation of the Mathematical Model and Theory

The mathematical model will now be presented with reference to FIG. 4. The noise intercepted transmission line produces electromagnetic waves propagating in both directions and reflecting from line ends unless they are terminated with a perfect impedance match.

At discrete frequencies these reflections will add in phase to create maxima and anti-phase to create minima. Then the observed power spectrum will exhibit multiple "resonant" frequencies. Likewise it will exhibit multiple dips at the "anti-resonant" frequencies. Noise entry point is assumed to be x km apart from the far end of the transmission line; consequently d−x km from the near end. The transceiver, e.g. an IP DSLAM, at the near end is used as a noise measuring device. The electromagnetic wave travels to the transceiver along two paths:

it propagates directly to the transceiver along the d−x km portion of the transmission line, and propagates towards the far end where it is bounced back to transceiver passing
1) through the x km portion of the transmission line,
2) reflecting at the far end represented by a reflection coefficient $\rho_d$ and continues to propagate through the transmission line of length d km. Totally passing d+x km.

subsequently, electromagnetic waves reflect from two electrical "walls", the output of the transceiver and the far end of the transmission line infinitely number of times.

Different propagation delay for each path causes different phases relation and an interference pattern becomes visible. The reflection coefficients are equal to $\rho_0$ at the CO end and $\rho_d$ at the far end. This may be mathematically formulated as follows $$S_m(\omega) = A(\omega) \cdot (e^{-\gamma(d-x)} + \rho_d \cdot e^{-\gamma(d+x)}) \cdot \qquad (1)$$
$$\left(1 + \rho_0 \cdot \rho_d e^{-\gamma 2d} + (\rho_0 \cdot \rho_d \cdot e^{-\gamma 2d})^2 + \ldots \right) \cdot \sqrt{1-\rho_0^2} =$$
$$= A(\omega) \cdot \frac{e^{-\gamma(d-x)} + \rho_d \cdot e^{-\gamma(d+x)}}{1 - \rho_0 \cdot \rho_d \cdot e^{-\gamma 2d}} \cdot \sqrt{1-\rho_0^2}$$
$$= A(\omega) \cdot \frac{e^{-\gamma(d-x)} \cdot (1 + \rho_d \cdot e^{-\gamma 2x})}{1 - \rho_0 \cdot \rho_d \cdot e^{-\gamma 2d}} \cdot \sqrt{1-\rho_0^2}$$

where $\gamma$ is propagation constant, $\sqrt{1-\rho_0^2}$ is the transmission coefficient on the measurement side, $\omega=2\pi f$ is angular frequency, $A(\omega)$ is a frequency dependent noise stimulus, and $$\frac{S_{in}(\omega) \cdot S_{in}(\omega)^*}{2 \cdot \pi}$$

is the energy spectral density.

Examining the above expression it is possible to distinguish two distinct oscillating terms. Consequently the resulting power spectrum will vary periodically with certain periodicity. The first oscillating term is present in the nominator of expression (1); its frequency corresponds to the position of the noise entry point related to the far end while amplitude corresponds to the attenuation of the x km portion of the transmission line. The second oscillating term is present in the denominator; its frequency corresponds to the line length. In general, those two terms can interact with each other producing an interference pattern that can be quite complicated including repetitive fluctuations (beats). In certain cases, e.g. when the x to d ratio is not rational, the interference pattern may be a-periodic.

One may observe that the interference pattern depends to a greater extent on $e^{-\gamma 2x}$ than on $e^{-\gamma 2d}$. There are at least two reasons for this; one is the case when x<<d, which gives $e^{-\gamma 2d} << e^{-\gamma 2x}$ and the other is when the magnitude of the near-end reflection coefficient is small, which is true for any properly designed and deployed xDSL modem (typical values could be 0.1-0.2). The far end reflection coefficient can take any value between −1 and +1, e.g. due to line faults or a missing CPE. Thus, $|\rho_0|<<1$ and $|\rho_d|\leq 1$, and therefore the product $|\rho_0 \cdot \rho_d|$ is relatively small in comparison to $|\rho_d|$, $|\rho_0 \cdot \rho_d| \leq \rho_d$. Hence, in practice, the denominator is more or less equal to one, $1-\rho_0 \cdot \rho_d \cdot e^{-\gamma 2d} \approx 1$.

The ratio between maximum and minimum envelopes (corresponding to difference in log scale), peak-to-least peak ratio (P2PR) can then be approximated as $$P2PR = \left(\frac{1+|\rho_d \cdot e^{-\gamma 2x}|}{1-|\rho_d \cdot e^{-\gamma 2x}|}\right)^2 \quad (2)$$

as the frequency varies between resonant and anti-resonant frequencies. By also considering that $\gamma=\alpha+i\beta$ where $\alpha$ affects the attenuation and $\beta$ affects the phase of the signal, we have that $|e^{-\gamma 2x}|=e^{-\alpha 2x}$ is the attenuation experienced by a wave traveling a distance $2x$ through the cable. If some a priori information is available regarding the far end reflection coefficient and/or the attenuation (e.g. that the reflection coefficient is essentially constant over frequency), eq. (2) above may be solved. If $|\rho_d|$ is constant, it can be estimated by extrapolating P2PR to zero frequency, noting that $|e^{-\gamma 2x}| \to 1$ when $\omega \to 0$. After determination of $|\rho_d|$, eq. (2) may be solved to get the attenuation. Further, in cases when $|\rho_d|=1$, eq. (2) can be simplified in order to find the attenuation analytically:

$$P2PR = \left(\frac{1+1\cdot|e^{-\gamma 2x}|}{1-1\cdot|e^{-\gamma 2x}|}\right)^2 = \left(\frac{1+e^{-\alpha 2x}}{1-e^{-\alpha 2x}}\right)^2 = \left(\frac{e^{\alpha x}+e^{-\alpha x}}{e^{\alpha x}-e^{-\alpha x}}\right)^2 = \coth(\alpha x)^2 \Leftrightarrow \alpha x = \operatorname{arccoth}(\sqrt{P2PR}) \quad (3)$$

Where $\alpha x$ is attenuation in neper scale. It may be worth to mention that $\rho_0$, $\rho_d$, $\gamma$ are nonlinear functions of the frequency. In practice, the slight variation between consecutive maxima and consecutive minima does not influence the accuracy of x and d estimates much. The phenomenon can be considered as negligible comparing with other error sources.

The distance between two consecutive maxima/minima is mathematically related to the transmission line length; from eq. (1) one obtain $$\max \quad (\omega_k+\Delta\omega)\cdot\frac{2\cdot x}{v} - \omega_k \cdot\frac{2\cdot x}{v} = 2\cdot n \cdot \pi$$
$$\min \quad (\omega_k+\Delta\omega)\cdot\frac{2\cdot x}{v} - \omega_k \cdot\frac{2\cdot x}{v} = (2\cdot n-1)\cdot \pi$$

where n=1, 2, 3, . . . .
Hence, the noise entry point, x can be derived from $$x = \frac{v}{2\cdot \Delta f} \quad (4)$$

where $\Delta f$ is the measured frequency gap between two consecutive maxima or two consecutive minima, and v is the velocity of propagation where $v=\omega/\beta$. Twisted-pair transmission lines used for xDSL technology typically have a v close to ⅔ of the velocity of light in vacuum.

The sign of the reflection coefficient at the far end can be determined from the positions of the extremes in the power spectrum. If the sign of the reflection coefficient is positive (high impedance, e.g. open end), there will be maxima at (or close to) integer multiples of the frequency gap mentioned above, i.e. at $f=n\cdot\Delta f$ (n=0, 1, 2, 3, . . . ). In a similar way, if the sign of the reflection coefficient is negative (low impedance, e.g. short-circuited end), there will be minima at (or close to) $f=n\cdot\Delta f$ (n=0, 1, 2, 3, . . . ).

When a measurement from the other end is possible, the length of the remaining part of the loop can be determined since the length value seen in that case, x', is actually (d−x). Thus the total loop length can be calculated since, $$x'+x=d-x+x=d \quad (5)$$

It may also be possible to identify d without a measurement from the other end, provided that the magnitude of the near-end reflection coefficient, $|\rho_0|$, is sufficiently larger than zero. However, it should be noted that the oscillations corresponding to d have lower amplitude than the oscillations corresponding to x and may thus be difficult to detect.

The power spectrum of the observed interference pattern in the frequency domain is related to the sampled time-domain autocorrelation function via the Discrete Fourier Transform $$r(t,v)=\operatorname{real}(IDFT(|S_{im}(\omega)|^2) \quad (6)$$

Apart from the trivial peak at time instant zero, the autocorrelation function will exhibit an extreme value (peak or dip) at the time instant when the electromagnetic wave has traveled a distance $2\cdot x$ and may also, as mentioned earlier, exhibit extremes at time instants corresponding to when the wave has traveled integer multiples of the loop length d. Here, the time axis can be rescaled to the distance axis using the cable's velocity of propagation. The autocorrelation is thus one possible way to automate the methods described in the current invention. Depending on whether said extreme in the autocorrelation is a maximum or minimum, the sign of the reflection coefficient at the far end is positive or negative respectively. This is because the wave traveling from the noise entry point toward the near end is not affected by the reflection coefficient at the far end, $\rho_d$, while the wave traveling in the opposite direction is affected.

For the special case of x=d, the transmission line length can be estimated from eq. (4) as $$d = \frac{v}{2\cdot \Delta f}. \quad (7)$$

Similarly, the P2PR will depend solely on d $$P2PR = \left(\frac{1+|\rho_d \cdot e^{-\gamma 2d}|}{1-|\rho_d \cdot e^{-\gamma 2d}|}\right)^2, \quad (8)$$

which can be used to determine the attenuation of the whole loop and the magnitude of the far end reflection coefficient. If the reflection coefficient is essentially constant over frequency, we may also here (as mentioned in conjunction with eq. (2)) determine $|\rho_d|$ by extrapolating P2PR to zero frequency:

$$P2PR = \left(\frac{1+|\rho_d|}{1-|\rho_d|}\right)^2 \Leftrightarrow |\rho_d| = \frac{\sqrt{P2PR}-1}{\sqrt{P2PR}+1}. \quad (9)$$

Application Examples

A few illustrative examples of the information that can be extracted with a transceiver that just passively records the activity of a transmission line will be given. To start with, results are given for a couple of examples simulated using Matlab®.

FIGS. 6 (6a, 6b, 6c, 6d) and 7 (7a, 7b, 7c, 7d) show simulations of a 250 meter long cable (wire gauge 0.4 mm) where the noise has been injected 200 meter from the CO side. FIG. 6 show results when measurements are performed from the CO side (thus, x=50) and FIG. 7 show results when measurements are performed from the CP side (x=200). The reflection coefficients have been assumed to be $\rho_0=0.2$ for the near end (measurement side) and $\rho_d=1$ (open far end).

Figure 6A:
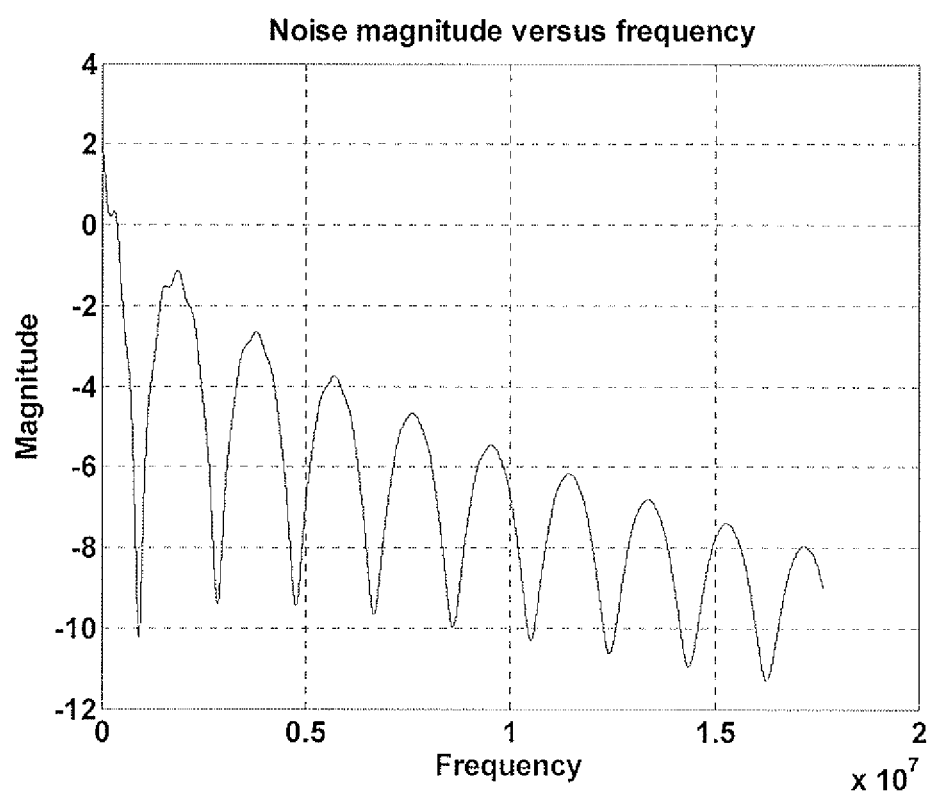
FIGS. 6, 7, 8, 9, 10 and 11 are all graph diagrams depicting the result of different performed simulations and measurements for illustrating the correctness of the present invention.

Starting with the graph in FIG. 6a, an interference pattern is clearly visible in the simulated noise magnitude; using eq. (4), it can be seen that the frequency gap between the extreme points (about 2 MHz) correspond to the loop length from the noise ingression point to the far end (x=50 m).

Figure 6B:
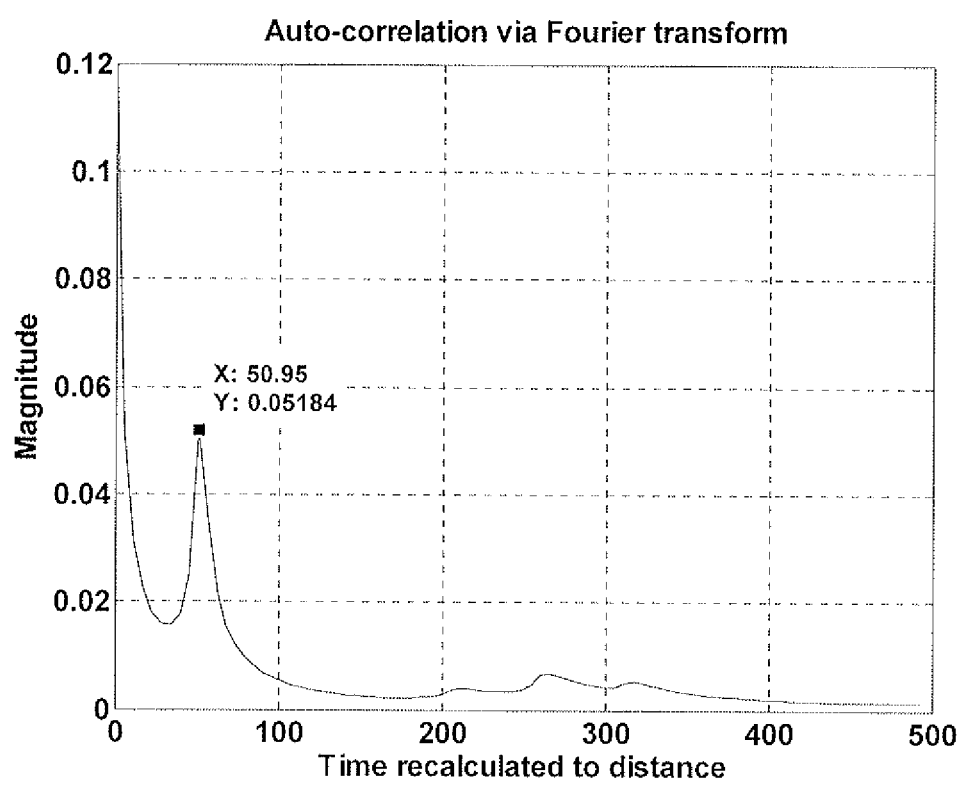

FIG. 6b. shows a graph of the autocorrelation calculated using eq. (6) with the noise spectrum from FIG. 6a as input. Here, the magnitude is a function of time converted to distance. The graph is clearly exhibiting a peak at distance 51 m. The graph also shows a small peak at about 260 meter, representing an estimate of the total loop length d (250 meter). The discrepancies in the length estimates compared with the true values (50 meter and 250 meter) are primarily caused by the fact that the cable's velocity of propagation differs slightly from the assumed value of $200 \cdot 10^6$ m/s.

Figure 7A:
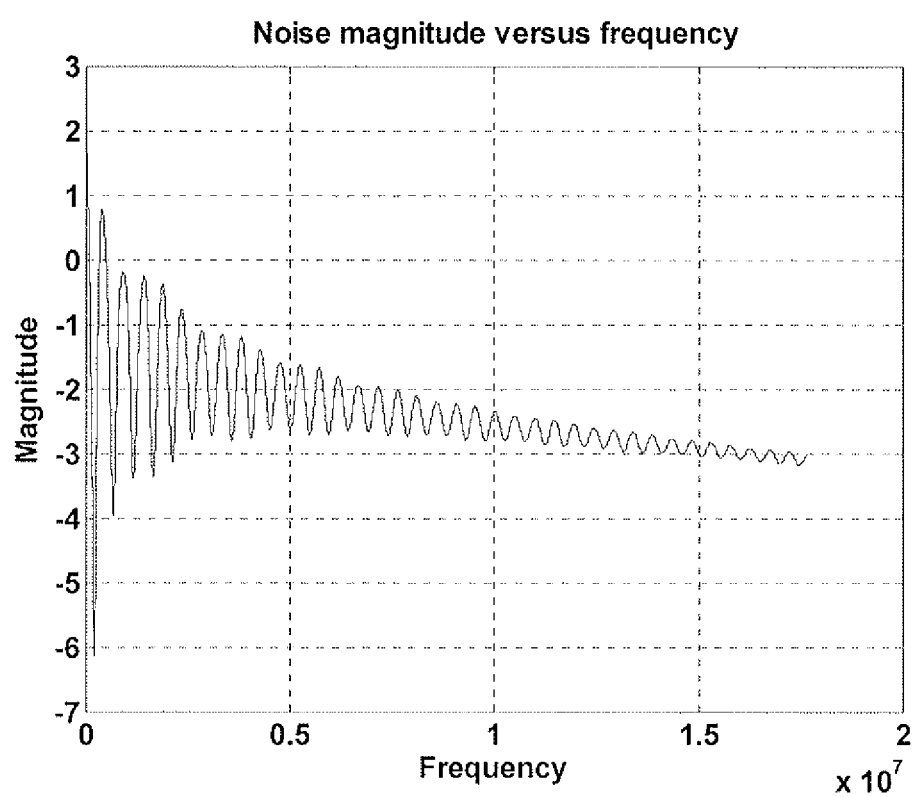
Figure 7B:
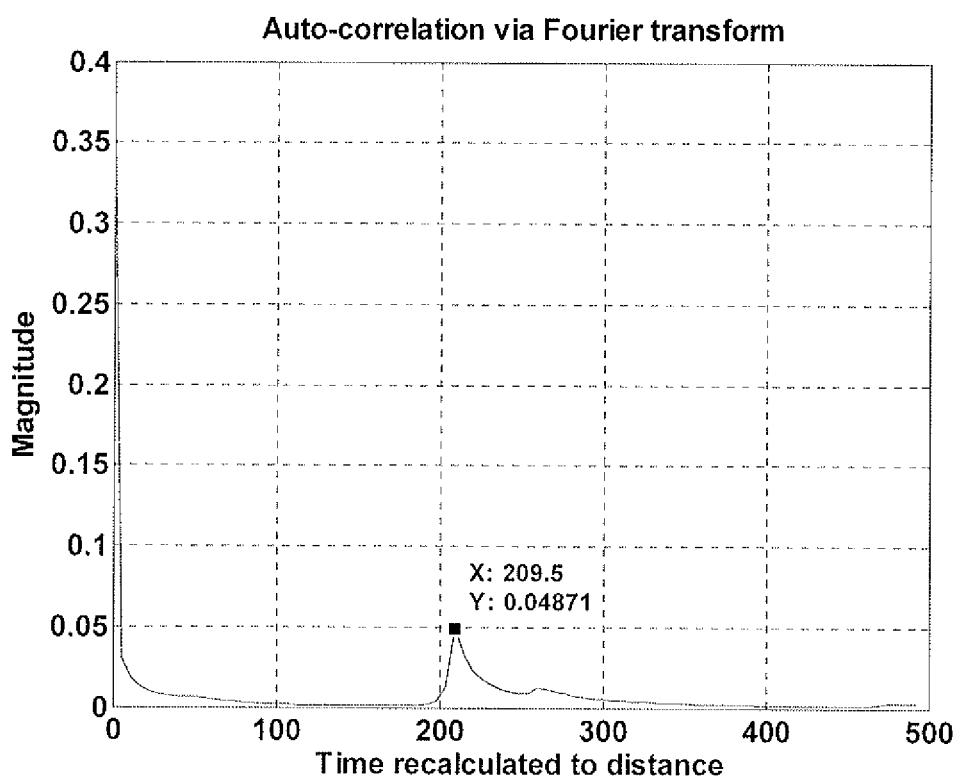

FIGS. 7a and 7b shows the corresponding results when measurements are performed from the CP side. Here, the frequency gap in FIG. 7a is about 0.5 MHz, which translates to 200 m using eq. (4). The autocorrelation function in FIG. 7b shows a distinct peak at about 210 meter and a smaller peak at about 260 meter. The results are in accordance with the simulated setup (x=200 m, d=250 m)

When measurements are possible from both ends as here (FIG. 6 and FIG. 7), the total loop length d can be found by adding the two x values according to eq. (5), i.e. 50 m+200 m=250 m.

As mentioned earlier, an envelope may be obtained by connecting consecutive maxima or minima in the noise spectrum. This envelope will then be a known function of the attenuation of the line. Thus, line attenuation may be extracted from eq. (2) assuming that some a priori information is available about the far end reflection coefficient (e.g. that it is fairly constant over frequency). See FIGS. 6c, 6d, 7c, and 7d.

In association with the fact that the length of the corresponding portion of the transmission line (x km) can be estimated from eq. 4, the attenuation per kilometer can also be determined, which can be used e.g. to characterize the cable gauge.

Figure 6C:
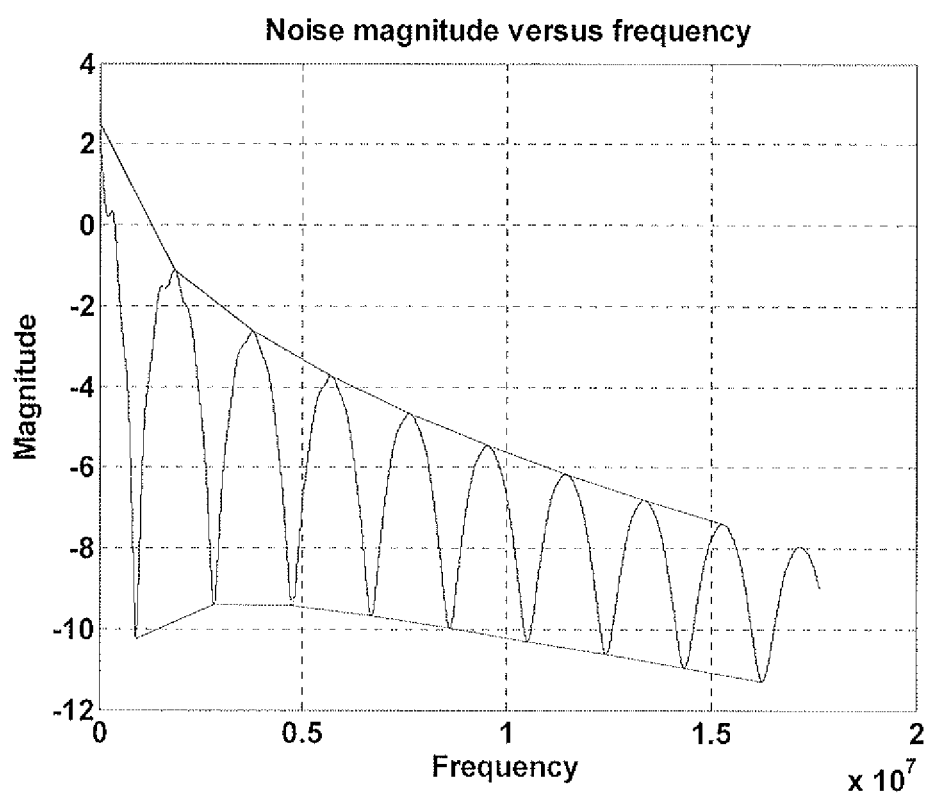

FIG. 6c. is illustrating envelope extraction from the noise spectrum shown in FIG. 6a. The difference between upper and lower envelope (in dB scale) converted to linear scale gives the P2PR in eq (2). In this example, it is known a priori that the magnitude of the reflection coefficient is equal to one and thus eq. (3) applies and gives the attenuation of loop portion Sx. The result of said calculation is illustrated in the graph of the diagram of FIG. 6d.

Figure 6D:
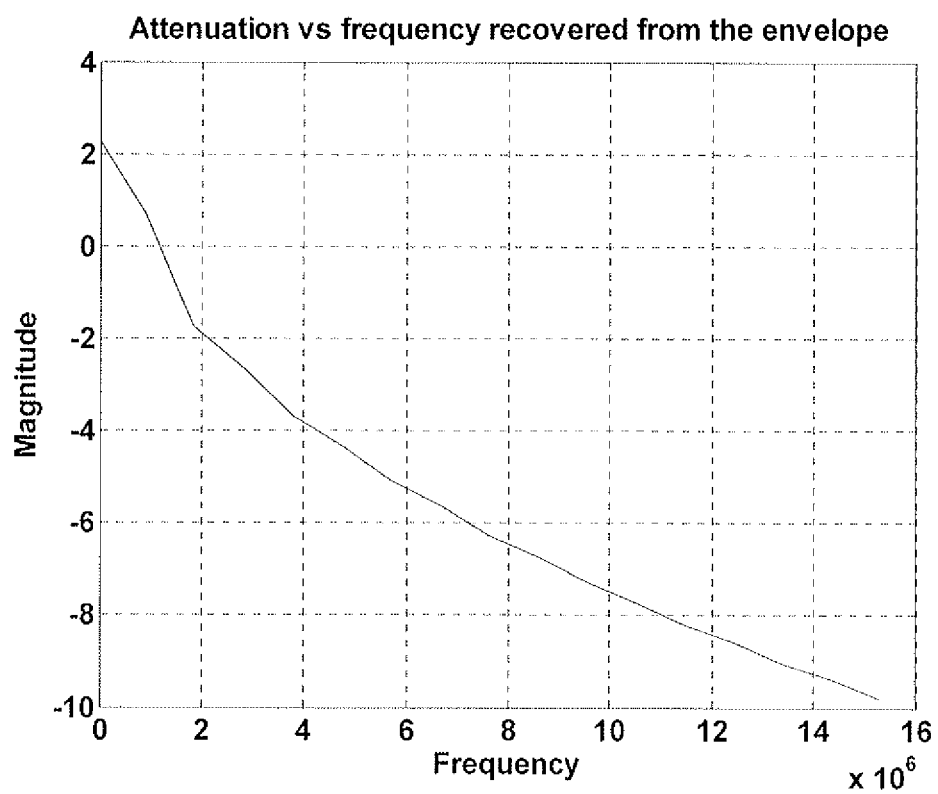
Figure 7C:
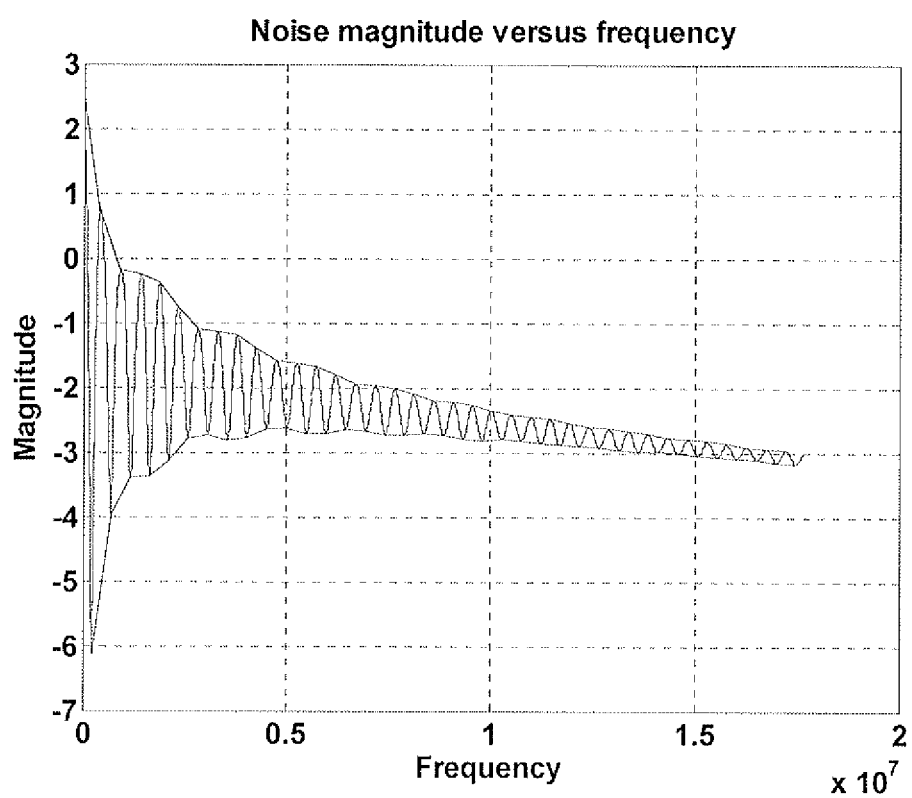
Figure 7D:
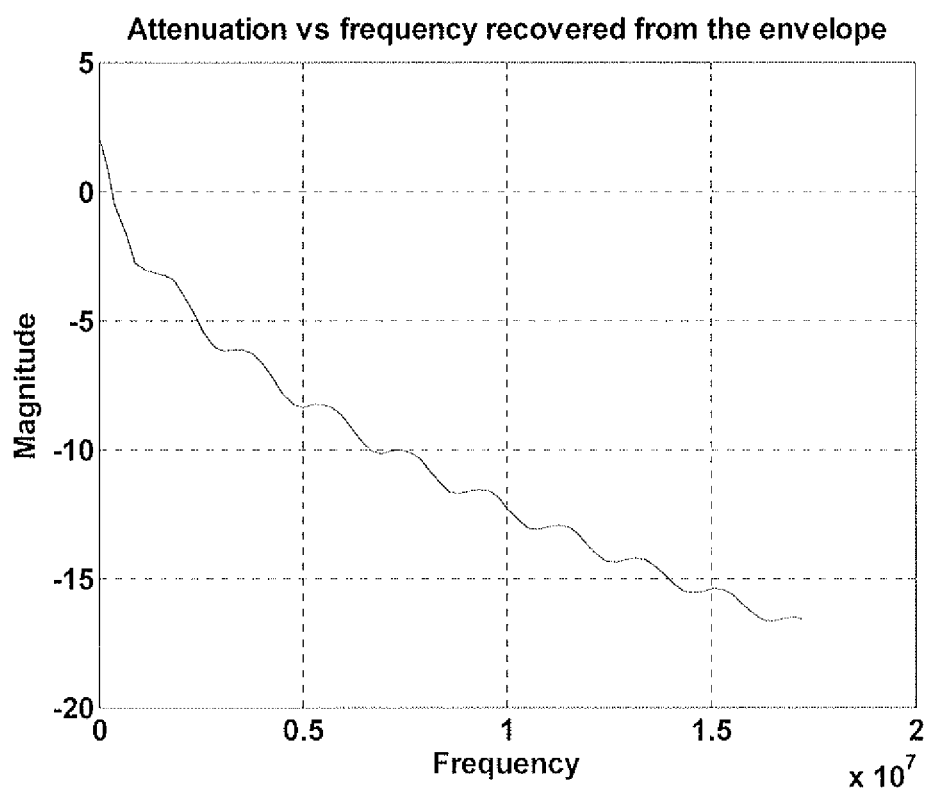

FIG. 7c illustrates the envelope extraction from the noise spectrum shown in FIG. 7a, and FIG. 7d, in the corresponding way as in FIG. 6d, illustrates the estimation of the attenuation of segment Sx, which here is 200 m long. The ripple on the envelope in FIG. 7c is caused by "beats" between the oscillations in the numerator and denominator of expression (1). Here, the assumptions that were used to derive eq. (2) from (1) are not completely valid, which yields the ripple on the attenuation estimate in FIG. 7d.

The simulated interference patterns were then compared with laboratory measurements performed on real cables. It is assumed that the measured power spectrum is averaged over long time so that errors due to the statistical character of exciting sources are negligible.

Figure 8A:
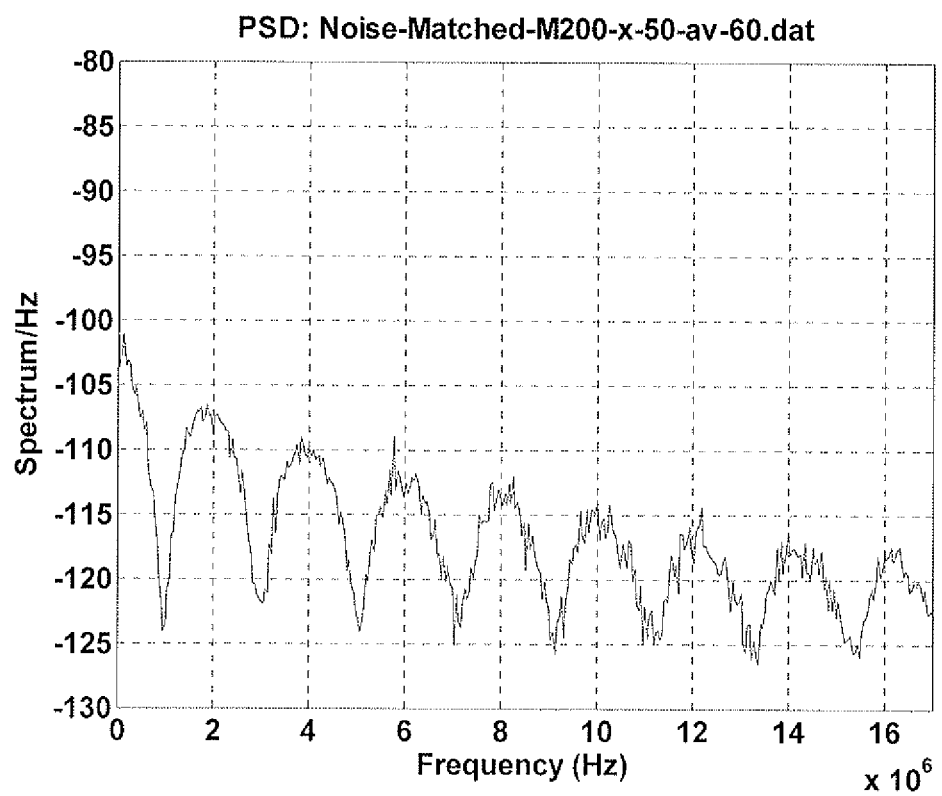

FIG. 8a. shows a noise magnitude versus frequency graph resulting from a noise measurement made at the CO side on a 250 meter long transmission line with an open far end. The noise ingress point is located 50 meter from the far end. Consecutive peaks and consecutive dips are spaced by approximately 2 MHz as in the simulated case (cf. FIG. 6a). Since the noise spectrum has maxima at integer multiples of 2 MHz, the sign of the far end reflection must be positive (e.g. open end, $\rho_d=1$).

Figure 8B:
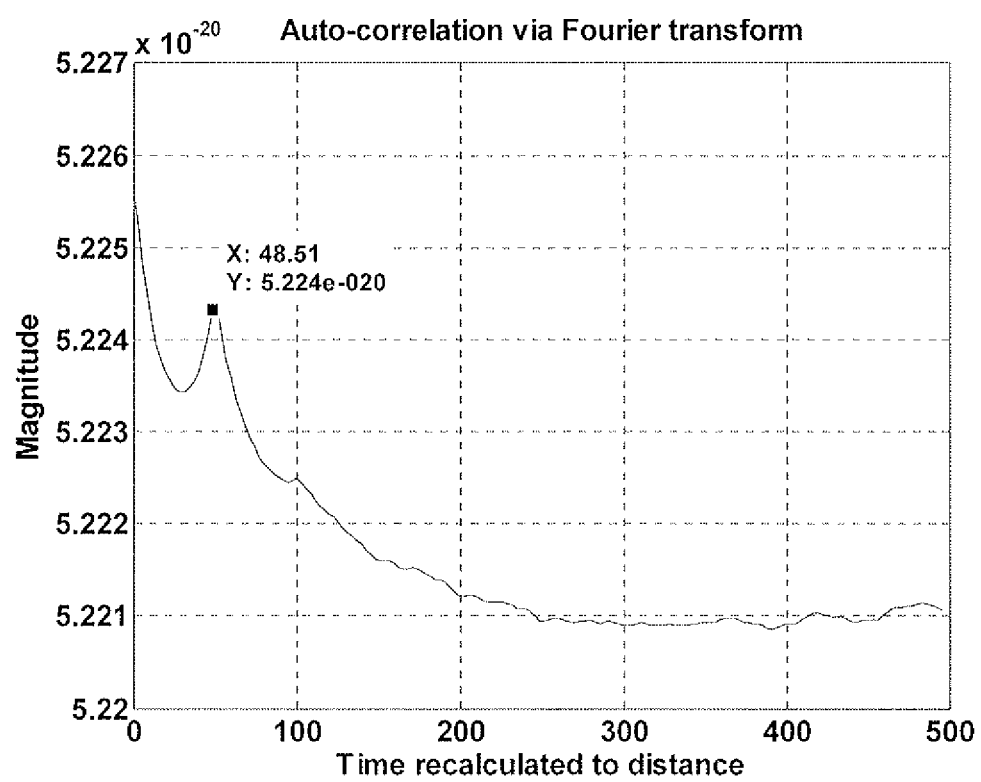

FIG. 8b. shows a graph of the magnitude of the autocorrelation calculated using eq. (6) with the noise spectrum from FIG. 8a as input. The graph of the autocorrelation function exhibits a peak at 49 m, which is again very close to the true value (x=50 m). Since the extreme of the autocorrelation is a positive peak, the sign of the far end reflection is shown also here to be positive.

Figure 9A:
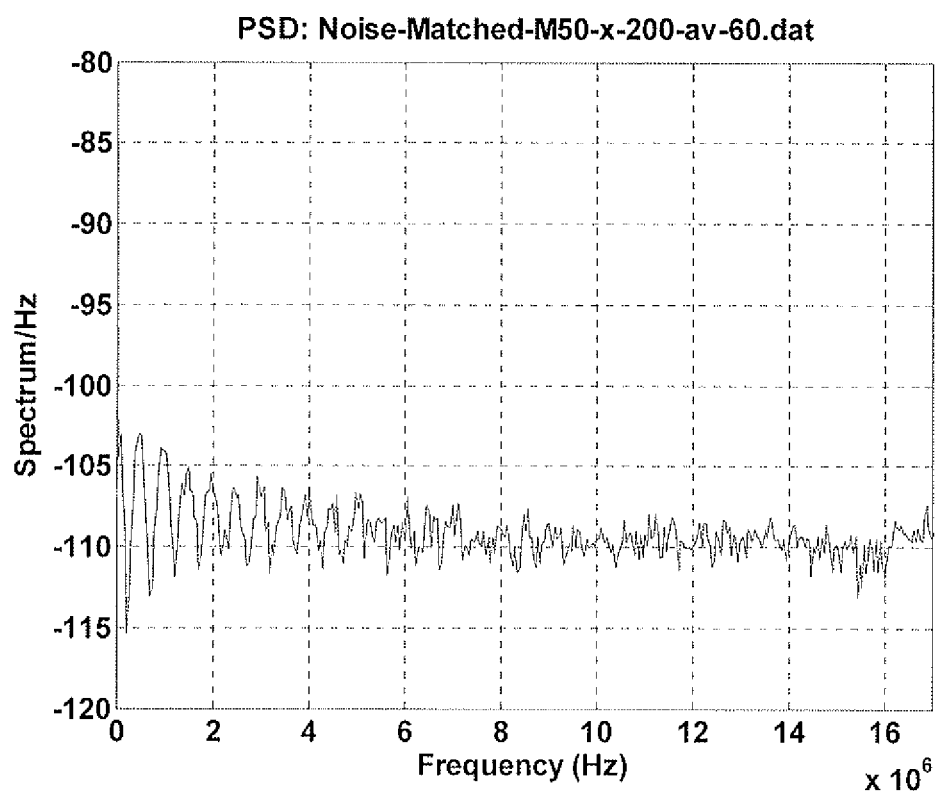
Figure 9B:
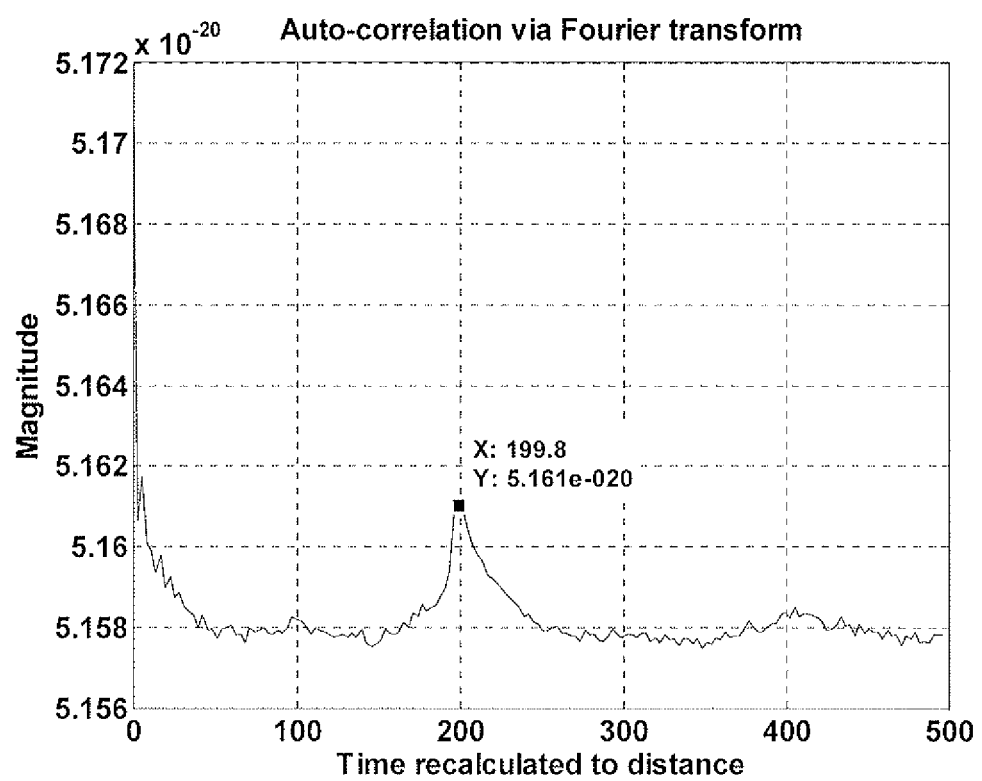

FIGS. 9a and 9b show the corresponding case as in FIG. 8 when measurements are instead performed from the CP side of the loop. The noise ingress point is thus located 200 m from the far end (50 meter from the measurement device). Consecutive peaks and consecutive dips in FIG. 9a are spaced by approximately 0.5 MHz, yielding x=200 m. The autocorrelation function in FIG. 9b shows a peak at 200 m according to the theory.

Figure 10A:
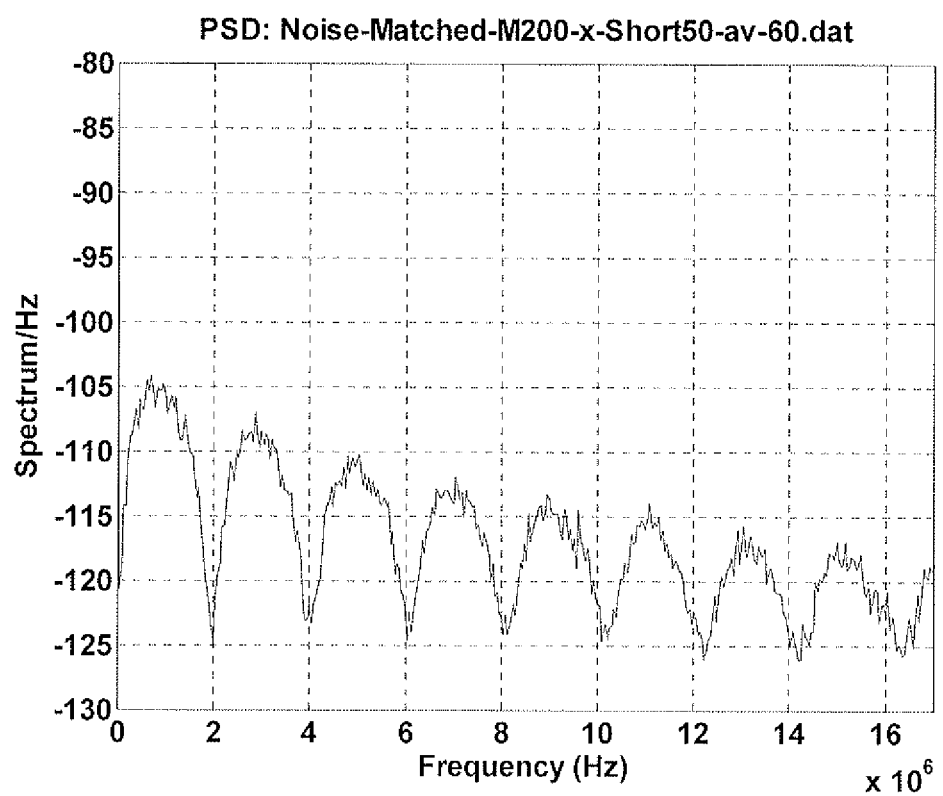
Figure 10B:
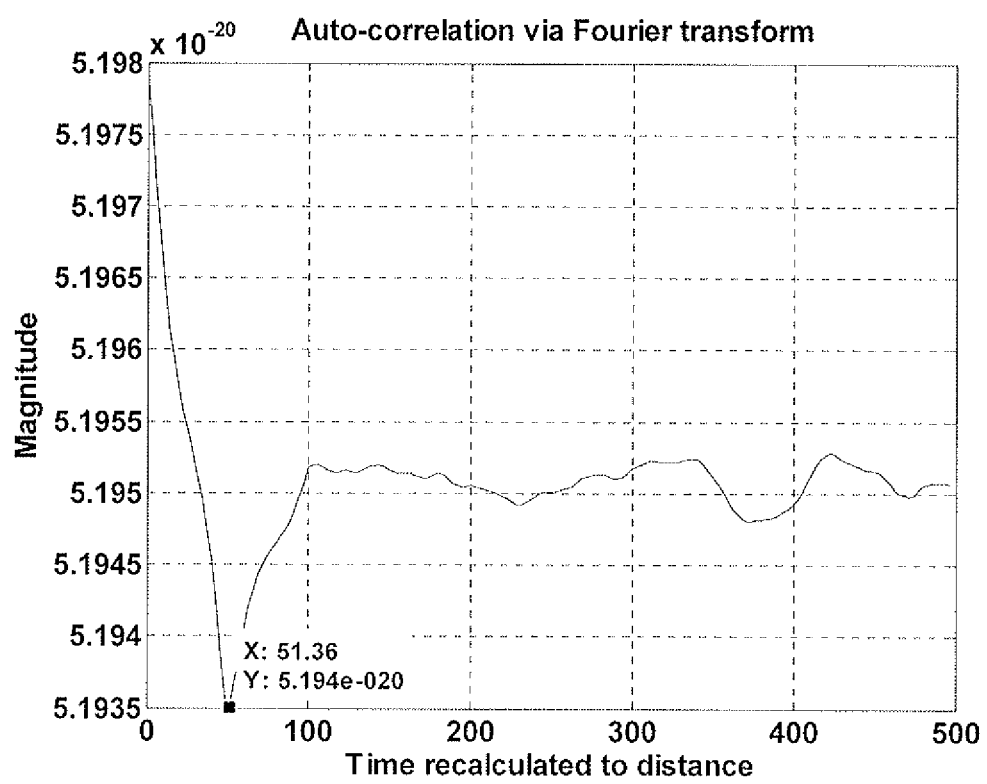
Figure 11A:
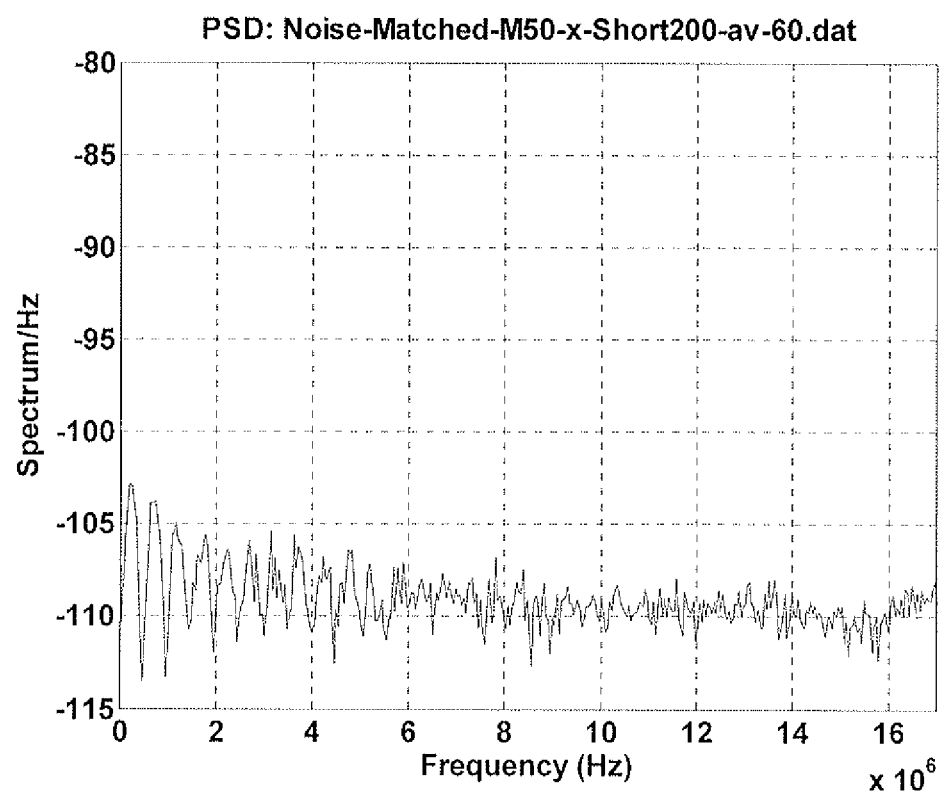
Figure 11B:
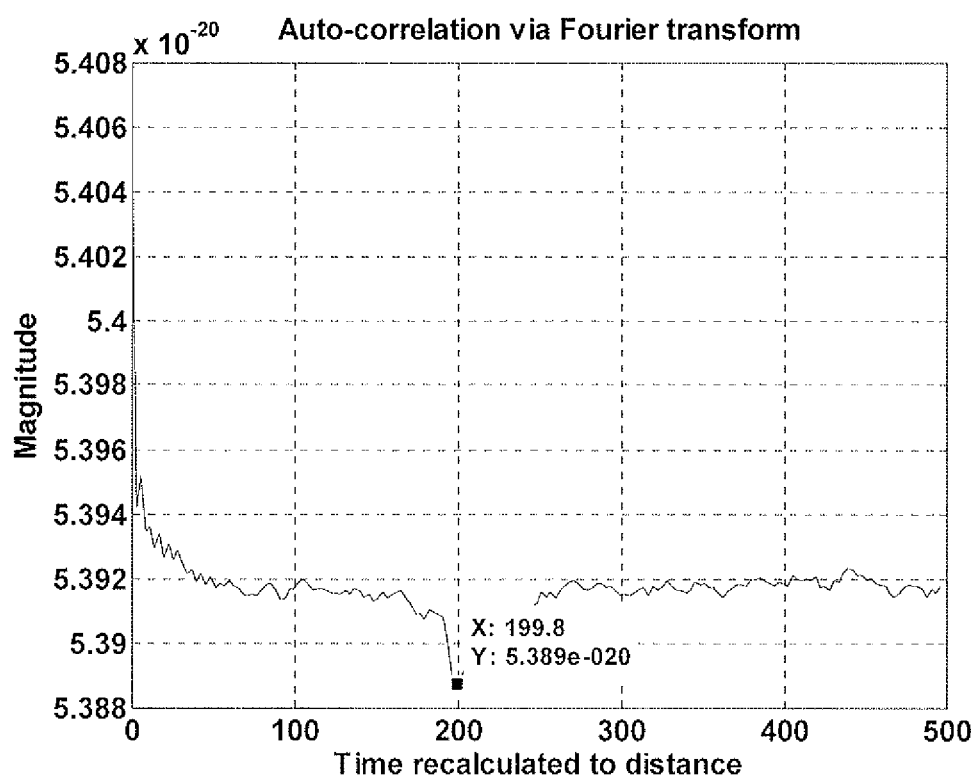

FIGS. 10 (10a, 10b) and 11 (11a, 11b) show measurements of the same cable as in FIGS. 8 (8a, 8b) and 9 (9a, 9b) but with a short-circuit termination at the far end instead of an open end. The length estimates are similar. As can be seen the maxima and minima are phase shifted 180 degrees compared to the previous measurements indicating a short instead of an open far end. Since FIG. 10a has minima at integer multiples of the frequency gap, the sign of the far end reflection must be negative (e.g. short-circuit, $\rho_d=-1$). FIG. 10b shows a negative peak (dip) at the distance corresponding to x, which again shows that the sign is negative. FIGS. 11a and 11b also show a negative sign of the reflection.

The present invention is not limited to the above-described preferred embodiments. Various alternatives, modifications and equivalents may be used. In the exemplified embodiments the measuring device is a transceiver unit. The transceiver unit comprises a transmitter and a receiver. The method according to the present invention actually utilizes the receiver part only when measuring the noise levels. Therefore, the transceiver unit in the measuring device may be replaced by a receiver unit in the embodiments. Therefore, the above embodiments should not be taken as limiting the scope of the invention, which is defined by the appending claims.

The invention claimed is:

1. A method for estimating properties of a transmission line, said transmission line having a first end and a second end opposite to the first end, comprising the steps of:
measuring a spectrum of a noise at the first end of the transmission line; and
estimating one or more transmission properties based on one or more features of said spectrum,
wherein said noise enters said transmission line at an intermediate location between the first end and the second end, wherein said one or more transmission property estimates are estimates of transmission properties of the transmission line or a segment of the transmission line, said segment being the part of the transmission line between the location where the noise enters the transmission line and the second end of the transmission line, wherein the measuring of the spectrum results in measured noise characteristic data of a noise interference pattern comprising extreme values, including one or more of maximum values at resonance frequencies and identified minimum values at anti-resonance frequencies, wherein said one or more transmission properties include whether the line termination of the line or line segment is high impedance or low impedance, and is determined by the steps of:

determining autocorrelation function values of the measured spectrum of the noise;

determining if the greatest extreme value is a peak or a dip of said autocorrelation function values; and setting the line termination as high impedance if the greatest extreme value is a peak and setting the line termination as low impedance if the greatest extreme value exhibits a dip.

2. A method for estimating properties of a transmission line, said transmission line having a first end and a second end opposite to the first end, comprising the steps of:

measuring a spectrum of a noise at the first end of the transmission line; and estimating one or more transmission properties based on one or more features of said spectrum, wherein said noise enters said transmission line at an intermediate location between the first end and the second end, and said one or more transmission property estimates are estimates of transmission properties of the transmission line or a segment of the transmission line, said segment being the part of the transmission line between the location where the noise enters the transmission line and the second end of the transmission line, wherein the measuring of the spectrum results in measured noise characteristic data of a noise interference pattern comprising extreme values, including one or more of maximum values at resonance frequencies and identified minimum values at anti-resonance frequencies, wherein said one or more transmission properties include attenuation along the line or the line segment, and is determined by:

determining an upper envelope by using the detected maximum values from the measured spectrum of the noise and a lower envelope by using the detected minimum values from the measured spectrum of the noise;

subtracting corresponding lower envelope values from upper envelope values;

setting a difference in magnitude per frequency as an estimate of a function of the line or line segment attenuation; and inverting said function numerically or analytically.

3. The method according to claim 1, wherein a transceiver comprising a digital signal processor adapted for passive single-ended line test (SELT) is used for measuring the noise spectrum.

4. The method according to claim 3, wherein the transceiver is integrated in an xDSL modem and the transmission line is a transmission line used for xDSL technology.

5. A transceiver unit electrically connectable to a transmission line having a first end and a second end opposite to the first end, comprising:

an input for receiving a first signal;
an output for transmitting a second signal; and
a processor configured to:
  measure a spectrum of a noise at the first end of the transmission line, wherein the measuring results in measured noise characteristic data of a noise interference pattern comprising extreme values, including one or more of maximum values at resonance frequencies and identified minimum values at anti-resonance frequencies; and
  estimate one or more transmission properties based on one or more features of said spectrum, wherein said one or more transmission properties include whether the line termination of the line or a line segment is high impedance or low impedance;
  determine autocorrelation function values of the measured spectrum of the noise;
  determine if the greatest extreme value is a peak or a dip of said autocorrelation function values; and
  set the line termination as high impedance if the greatest extreme value is a peak and set the line termination as low impedance if the greatest extreme value exhibits a dip,
wherein said noise enters said transmission line at an intermediate location between the first end and the second end, and
wherein said one or more transmission property estimates are estimates of transmission properties of the transmission line or the segment of the transmission line, said segment being part of the transmission line between the intermediate location where the noise enters the transmission line and the second end of the transmission line.

6. The transceiver unit according to claim 5, wherein said processor is a digital signal processor.

7. The transceiver unit according to claim 5, wherein the transceiver unit is integrated in a xDSL modem and the transmission line is a transmission line used for xDSL technology.

* * * * *

UNITED STATES PATENT AND TRADEMARK OFFICE
CERTIFICATE OF CORRECTION

PATENT NO.       : 8,705,636 B2
APPLICATION NO.  : 13/375532
DATED            : April 22, 2014
INVENTOR(S)      : Fertner et al.

Page 1 of 1

It is certified that error appears in the above-identified patent and that said Letters Patent is hereby corrected as shown below:

In the Specification

In Column 12, Line 24, in Equation (6), delete "$r(t,v)=real(IDFT(|S_{im}(\omega)|^2$" and insert --$r(t, v) = real(IDFT(|S_m(\omega)|^2))$--, therefor.

Signed and Sealed this
Ninth Day of September, 2014

Michelle K. Lee
*Deputy Director of the United States Patent and Trademark Office*